United States Patent [19]

Murayama et al.

[11] Patent Number: 4,911,966
[45] Date of Patent: Mar. 27, 1990

[54] OPTICAL DISK SUBSTRATE

[75] Inventors: Masamitsu Murayama, Yokkaichi; Kanji Kasahara, Yokohama, both of Japan

[73] Assignee: Mitsubishi Monsanto Chemical Company, Tokyo, Japan

[21] Appl. No.: 279,088

[22] Filed: Dec. 2, 1988

[51] Int. Cl.$^4$ ................................................ B32B 3/00
[52] U.S. Cl. ........................................ 428/64; 428/65; 428/411.1; 428/913; 430/945; 346/76 L; 346/135.1; 369/288
[58] Field of Search ................ 428/64, 65, 913, 411.1; 430/945; 346/76 L, 135.1; 369/288

[56] References Cited

FOREIGN PATENT DOCUMENTS 43910 2/1988 Japan .
1706 1/1989 Japan .

Primary Examiner—Patrick Ryan
Attorney, Agent, or Firm—Oblon, Spivak, McClelland, Maier & Neustadt

[57] ABSTRACT

An optical disk substrate made of a non-crystalline thermoplastic resin comprising from to 80 to 100% by weight of a vinyl cyclohexane polymer (A) containing at least 80% by weight of a vinyl cyclohexane component in the molecular chain and from 0 to 20% by weight of a vinyl aromatic polymer (B) and having a light transmittance of at least 85%, a water absorbance of at most 0.1% by weight and a double refraction of at most 50 nm.

5 Claims, No Drawings

OPTICAL DISK SUBSTRATE

The present invention relates to an optical disk substrate. More particularly, it relates to an optical disk substrate made of a non-crystalline thermoplastic resin composed essentially of a vinyl cyclohexane polymer (A) having excellent light transmittance, low water absorbance and small double refraction, which is useful for an optical high density information recording medium.

Along with the progress in the technology for information treatment by means of computers, a large capacity memory device for digital data is now required, and optical disks are now used as memory devices for data recording for industrial file systems or for image recording or sound recording for domestic use. Such optical disks are optical high density information recording media designed so that digital signals from the optical disk surface can be recorded and/or reproduced by utilizing changes in the optical reflection or magnetic effects of the laser beams at the optical disk surface.

Heretofore, as such optical disks, compact disks, video disks, optical memory disks for computers, optical magnetic disks and digital data memory devices such as optical cards have been developed or practically used. These optical disks comprise an optical disk substrate and a memory-functional layer or the like. The material for the optical disk substrate is required to have the following properties.

(1) The light transmittance is high.
(2) The water absorbance and the dimensional change by absorption of water are small.
(3) The double refraction is small.
(4) The fluctuation in the refractive index is small.
(5) The thermal deformation temperature is high.
(6) The moldability is good.

Heretofore, a thermoplastic resin such as a methyl methacrylate resin or a polycarbonate resin, a thermosetting resin such as an epoxy resin, and an inorganic material such as glass, have been used as the materials for optical disk substrates. However, each of these optical disk substrate materials has certain drawbacks with respect to some of the above-mentioned required properties.

The methyl methacrylate resin has high water absorbance and thus has drawbacks such that it undergoes a dimensional change with time by absorption of water, the optical disk substrate undergoes warpage during its use, the flatness which is important for an optical disk deteriorates, cracking forms, or in the case of an optical disk composed of a laminate of two sheets, the bonding portion tends to peel, or a double refraction is likely to appear due to a distortion stress. In order to reduce these drawbacks, there have been attempts to reduce the water absorbance by copolymerizing a hydrophobic monomer as shown in Japanese Unexamined Patent Publication No. 217215/1985 or by forming a hydrophobic layer on the surface of an optical disk. However, such attempts have not been so successful. In view of the molecular structure, it is extremely difficult to substantially reduce the water absorbance of the methyl methacrylate resin. Another drawback of this resin is that the thermal deformation temperature is relatively low.

The polycarbonate resin has large double refraction. A method is employed whereby an optical disk substrate is molded under a condition to minimize the double refraction. However, this problem has not yet adequately been solved. For this reason, this material is used restrictively for compact disks with a small diameter adapted exclusively for reproduction of music, for which the allowable limit of the double refraction is relatively less critical. Further, the polycarbonate resin has low surface hardness, and the surface is susceptible to scratching during the use of the optical disk.

The epoxy resin requires a special molding apparatus specific to a thermosetting resin, and as compared with a thermoplastic resin, its molding cycle is long and the molding costs are high. Further, it has also a drawback that it can not be reused.

When glass is used as an optical disk substrate, there will be a drawback that the optical disk will be heavy since the density of glass is large, and a drawback that handling such as use and storage of the optical disk made of glass requires due care, since the impact strength is low. Further, glass is not a thermoplastic resin and can not be molded by a resin molding process suitable for a mass production system. Furthermore, an optical disk substrate made of glass requires complicated steps for memory recording such as surface treatment with a resin and post treatment, whereby the productivity is low, and the cost will be high.

The present inventors have conducted extensive researches with an aim to solve the above-mentioned various drawbacks of conventional optical disk substrates and, as a result, have arrived at the present invention. Namely, it is an object of the present invention to provide an optical disk substrate made of a non-crystalline thermoplastic resin composed essentially of a vinyl cyclohexane polymer (A) having excellent light transmittance, low water absorbance and small double refraction, which is useful for an optical high density information recording medium.

The present invention provides an optical disk substrate made of a non-crystalline thermoplastic resin comprising from 80 to 100% by weight of a vinyl cyclohexane polymer (A) containing at least 80% by weight of a vinyl cyclohexane component in the molecular chain and from 0 to 20% by weight of a vinyl aromatic polymer (B) and having a light transmittance of at least 85%, a water absorbance of at most 0.1% by weight and a double refraction of at most 50 nm.

Now, the present invention will be described in detail with reference to the preferred embodiments.

The optical disk substrate of the present invention is made of a non-crystalline thermoplastic resin.

In the present invention, the non-crystalline thermoplastic resin means a thermoplastic resin which contains no substantial stereoregular or crystalline resin. The reason why the optical disk substrate is made of a non-crystalline thermoplastic resin is that if the internal structure has stereoregularity or crystallinity, it tends to be optically non-uniform, thus causing turbidity or fluctuation. When the stereoregularity or crystallinity in the internal structure is substantially negligible and the structure can be regarded as non-crystalline, the above-mentioned non-crystalline thermoplastic resin is optically uniform and transparent and thus suitable for an optical disk substrate.

The above-mentioned non-crystalline thermoplastic resin is preferably per se moldable. The moldable means that a product having practical strength can be obtained by a usual molding method such as extrusion molding, injection molding or compression molding, and it is intended to exclude a resin having a too low or too high molecular weight.

The optical disk substrate of the present invention is made of a non-crystalline thermoplastic resin comprising from 80 to 100% by weight of a vinyl cyclohexane polymer (A) containing at least 80% by weight of a vinyl cyclohexane component in the molecular chain and from 0 to 20% by weight of a vinyl aromatic polymer (B).

The vinyl cyclohexane polymer (A) used for the optical disk substrate of the present invention must be a polymer having at least 80% by weight of a vinyl cyclohexane component in its molecule. If the polymer (A) does not contain at least 80% by weight of a vinyl cyclohexane component, the physical properties important for an optical disk substrate, such as light transmittance, water absorbance and double refraction, tend to be inferior, and the balance of various properties tends to be poor.

In a case where the vinyl cyclohexane polymer (A) is combined with the vinyl aromatic polymer (B), the vinyl aromatic polymer (B) may be incorporated in an amount of up to 20% by weight. It is preferred to incorporate the vinyl aromatic polymer (B), since it is thereby possible to improve the moldability of the above-mentioned noncrystalline thermoplastic resin and to improve various physical properties such as impact resistance. However, if the amount of the vinyl aromatic polymer (B) exceeds 20% by weight, the double refraction which is particularly important for an optical disk substrate tends to exceed the prescribed level, and the mixture tends to loose compatibility, whereby turbidity tends to form and the light transmittance tends to decrease, such being undesirable.

The vinyl cyclohexane polymer (A) can readily be prepared in accordance with the following two methods.

(1) A method in which a vinyl aromatic polymer (B) is hydrogenated to obtain a vinyl cyclohexane polymer (A).

(2) A method in which a compound such as a vinyl cyclohexane is used as starting material and polymerized to obtain a vinyl cyclohexane polymer (A).

In the present invention, the vinyl aromatic polymer (B) means a non crystalline polymer of a vinyl aromatic compound, or a non-crystalline copolymer of a vinyl aromatic compound as the main component with a small amount of other vinyl compound. The copolymer may be a random copolymer, a block copolymer or a graft copolymer. The copolymer may contain up to 20% by weight of other vinyl compound. If said other vinyl compound exceeds 20% by weight, the properties of the vinyl aromatic polymer (B) such as the light transmittance, the moldability, the heat resistance, the impact resistance or the surface hardness, are likely to deteriorate. When the vinyl aromatic polymer (B) is non-crystalline, the vinyl cyclohexane polymer (A) obtained by hydrolyzing such a non-crystalline material is also non-crystalline and suitable as a material for an optical disk substrate.

The vinyl aromatic compound includes styrene, α-methylstyrene, p-methylstyrene, t-butylstyrene and vinyl naphthalene. These compounds may be used alone or in combination as a mixture of two or more.

Said other vinyl compound includes a diene compound such as butadiene or isoprene, a methacrylate such as methyl methacrylate or cyclohexyl methacrylate, an acrylate such as methyl acrylate or butyl acrylate, methacrylic acid, acrylic acid, itaconic acid and acrylonitrile. These vinyl compounds may be used alone or in combination as a mixture of two or more.

There is no particular restriction as to the method for the preparation of the vinyl aromatic polymer (B). The vinyl aromatic polymer (B) can be prepared by a polymerization method such a bulk, solution, suspension or emulsion polymerization by using the above identified compound as the starting material and by using a radical polymerization catalyst or an anion polymerization catalyst which is commonly used for the preparation of a synthetic resin or synthetic rubber.

To obtain a vinyl cyclohexane polymer (A) by hydrogenating the vinyl aromatic polymer (B) in accordance with the above method (1), the following procedure may be employed.

According to this method (1), hydrogen is added to carbon constituting the aromatic ring in the side chain of the polymer molecule. Accordingly, a severe hydrogenating condition is required as compared with the usual hydrogenation of an olefin compound.

Namely, as the hydrogenation catalyst, it is preferred to select and use a catalyst having high catalytic activities and high catalytic selectivity. Otherwise, it takes a long time for hydrogenation, and a side-reaction is likely to take place whereby the molecular chain of the hydrogenated vinyl aromatic polymer (B) is broken, thus leading to a decrease in the molecular weight of the resulting vinyl cyclohexane polymer (A).

With respect to the form of the hydrogenation catalyst useful in the method (1), a solid or liquid catalyst may be used. Specific examples of the solid catalyst include fine powders of noble metals such as ruthenium, rhodium, palladium, platinum and nickel, and catalysts having such noble metals supported on a carrier such as active carbon. Specific examples of the liquid hydrogenation catalyst include solution-type catalysts, which are obtainable by reducing complexes of transition metal elements such as chromium and cobalt solubilized in organic solvents with alkylmetal compounds.

According to the method (1), the hydrogenation reaction is preferably conducted in a solution. As the solvent to be used here is preferably a solvent which forms a solvent system capable of dissolving the vinyl aromatic polymer (B) and the resulting vinyl cyclohexane polymer (A) and which does not form a catalyst poison. Specific examples of such a solvent include cycloalkanes such as cyclohexane and alkanes such as n-hexane. A polar compound such as an alcohol may be added in a certain amount to the above solvent system to control the hydrogenation condition.

The reaction conditions for hydrogenation, such as the reaction temperature, the reaction pressure and the reaction time, may appropriately be selected from the reaction conditions commonly employed for hydrogenation depending upon the type and concentration of the vinyl aromatic polymer (B), the type and concentration of the catalyst and the solvent used.

According to the method (1), after completion of the hydrogenation reaction, it is preferred to conduct post-treatment such as removal of the catalyst from the reaction solution. If the removal of the catalyst is inadequate, the resulting vinyl cyclohexane polymer (A) tends to have low light transmittance, or tends to cause an inclusion of foreign matters.

After the removal of the hydrogenation catalyst, the reaction solution is subjected to stripping or reprecipitation to remove the solvent, followed by drying to obtain a vinyl cyclohexane polymer (A).

According to the method (1), a product is obtainable in which hydrogen is added to an aromatic ring randomly bonded to the side chain of the vinyl aromatic polymer (B) molecule. Usually, the addition reaction of hydrogen takes place simultaneously at all of carbon atoms constituting one aromatic ring.

In order to obtain a vinyl cyclohexane polymer (A) containing at least 80% by weight of a vinyl cyclohexane component in the molecular chain according to the method (1), a condition may be selected so that at least 80% by weight of the aromatic rings in the side chains of the molecule of the vinyl aromatic polymer (B) is hydrogenated. When the vinyl aromatic polymer (B) is a copolymer containing other vinyl compound, a condition may be selected so that the hydrogenation ratio of the aromatic rings in the side chains of the molecule is increased.

The method (2) for the preparation of a vinyl cyclohexane polymer (A) includes a cation polymerization method and a method by coordination anion polymerization by means of a Ziegler catalyst.

According to the method (2), it is possible to obtain a polymer of a vinyl cyclohexane compound or a copolymer of a vinyl cyclohexane compound as the main component with a small amount of other vinyl compound copolymerizable with the vinyl cyclohexane compound. In the case of the copolymer, it is possible to readily obtain a vinyl cyclohexane polymer (A) containing at least 80% by weight of a vinyl cyclohexane component in the molecular chain by controlling the amount of said other vinyl compound to a level of at most 20% by weight.

The vinyl cyclohexane compound includes vinyl cyclohexane, α-methylvinyl cyclohexane, vinylmethyl cyclohexane and vinylbutyl cyclohexane. These may be used alone or in combination as a mixture of two or more.

Said other vinyl compound includes the compounds mentioned above as copolymerizable with the vinyl aromatic compound, and α-olefins such as ethylene, propylene and 4-methyl-1-pentene. These may be used alone or in combination as a mixture of two or more. These compounds may optionally be selected for use depending upon the nature of the desired vinyl cyclohexane polymer (A), the polymerization system employed and the polymerization catalyst. When cation polymerization is employed as the method (2), usual cation polymerization techniques can be used as they are. For example, a vinyl cyclohexane polymer (A) can be obtained by a solution polymerization at a polymerization temperature of at most 0° C. by using the above compound and a cation polymerization catalyst such as alminum tribromide. In the cation polymerization, a vinyl cyclohexane polymer (A) having a low molecular weight is likely to form, and it is therefore preferred to employ a low polymerization temperature to minimize the chain transfer during the polymerization.

When a method by coordination anion polymerization by means of a Ziegler catalyst is used as the method (2), usual coordination anion polymerization techniques may be employed as they are. For example, a vinyl cyclohexane polymer (A) can be obtained by polymerizing at a temperature of from 0° to 150° C. by using the above-mentioned compound as the monomer and a complex of a transition metal compound with an alkyl compound such as vanadium trichloride-triethylaluminum as the Ziegler catalyst. The Ziegler catalyst tends to impart stereoregularity or crystallinity to the internal structure of the resulting polymer. Therefore, in order to obtain a non-crystalline vinyl cyclohexane polymer (A), it is preferred to employ a randomizer, an atactic agent or a transition metal compound as an additive or co-catalyst suitably depending upon the type of the Ziegler catalyst and the type of the monomer compound used.

The vinyl aromatic polymer (B) to be mixed with the above-mentioned vinyl cyclohexane polymer (A) is the same as the vinyl aromatic polymer (B) as mentioned in the description of the method (1) for the preparation of the vinyl cyclohexane polymer (A).

The optical disk substrate of the present invention is obtained by molding by means of an injection molding machine or a compression molding machine for molding a compact disk or an optical disk by using the above-mentioned non-crystalline thermoplastic resin as the starting material. For the molding of an optical disk substrate, it is necessary to use a mold corresponding to fine roughness of an optical disk and to select the molding condition to minimize a molding strain. In order to avoid inclusion of any foreign matter during the molding of an optical disk substrate, it is necessary to carry out the operation in a clean atmosphere such as in a clean room.

In order to effectively accomplish the object of the present invention, the above-mentioned non-crystalline thermoplastic resin must have a light transmittance of at least 85%, a water absorbance of at most 0.1% by weight and a double refraction of at most 50 nm.

In the present invention, the "light transmittance" is a total light transmittance through a molded sheet having a thickness of $2.5\pm0.2$ mm, as measured by using an integral light transmittance measuring device in accordance with JIS K7105-1981 (measuring method A). If the light transmittance of the thermoplastic resin is less than 85%, a laser will be absorbed by the optical disk substrate, whereby the recording and/or reproduction of the digital signals by the optical disk will be difficult.

In the present invention, the "water absorbance" is a water absorbance measured by cutting a molded sheet having a thickness of $2.5\pm0.2$ mm into a predetermined square shape and immersing it in distilled water for $24\pm1$ hours in accordance with JIS K7209-1984 (method A). If the water absorbance of the thermoplastic resin exceeds 0.1% by weight, it is likely that due to absorption of water or moisture by the optical disk substrate, the optical disk undergoes warpage during its use, the memory functional layer is thereby impaired, and the useful life will be shortened.

In the present invention, the "double refraction" is a one pass retardation as measured by a senarumon compensator at a light wave length of 546 nm by using Nikon ® polarizing microscope manufactured by Nippon Kogaku Kogyo K.K. by using the center of the information recording portion of the molded product of a compact disk substrate. If the double refraction of the substrate exceeds 50 nm, it will be difficult to focus the laser to the information recording portion of the memory functional layer of the optical disk.

To the non-crystalline thermoplastic resin, an additives such as a releasing agent, a flowability improver, a heat stabilizer, a light resistant stabilizer, an antistatic agent or a coloring agent may optionally be incorporated as the case requires.

For the preparation of an optical disk from the optical disk substrate of the present invention, a memory functional layer such as a metal layer formed by vacuum metallizing or a coating layer of an organic recording medium is provided on the surface of the substrate, and a protective layer is formed thereon to obtain a desired optical disk. Such a optical disk is useful as an optical high density information recording medium such as a compact disk, a video disk, a memory disk for computers, an optical magnetic disk or a optical card.

As described in detail in the foregoing, the present invention has the following remarkable effects, and its value for industrial application is significant.

(1) The optical disk substrate of the present invention has merits over an optical disk substrate made of a methyl methacrylate resin in that the dimensional change due to absorption of water is small, deterioration of the memory functional layer due to absorption of water is less, and the heat resistance is excellent.

(2) The optical disk substrate of the present invention has merits over an optical disk substrate made of a polycarbonate resin in that the dimensional change due to absorption of water is small, the surface is hard, and the surface is less susceptible to scratching.

(3) The optical disk substrate of the present invention has merits over an optical disk substrate made of glass in that the density is small, it is light in weight, and it can be produced by mass production and thus has excellent productivity.

Now, the present invention will be described in further detail with reference to Preparation Examples and Working Examples. However, it should be understood that the present invention is by no means resricted by such specific Examples.

In the following Examples, various physical properties were measured in accordance with the following methods.

Refractive index:

In accordance with JIS K7105-1981, the refractive index of a molded sheet having a thickness of 2.5±0.2 mm was meausred by using Abbe refractometer.

Density:

In accordance with JIS K7112-1980 (method A), the density of a molded sheet having a thickness of 2.5±0.2 mm was measured by dipping it in distilled water.

Rockwell hardness:

In accordance with JIS K7202-1982, the Rockwell hardness (M scale: HRM) of a molded product having a thickness of 10±0.5 mm was measured.

Deflection temperature under load:

In accordance with JIS K7207-1983 (method A), the deflection temperature under load without annealing was measured.

Hydrogenation rate:

The hydrogenation rate was calculated from the analytical value of $^{13}C$ in a heavy hydrogenated chloroform solution of a vinyl cyclohexane polymer by means of a nuclear magnetic resonance apparatus (NMR G-270 model, manufactured Nippon Denshi K.K.).

Molecular weight:

The molecular weight of the vinyl cyclohexane polymer was measured in accordance with a method for measuring the molecular weight of polystyrene by a gel permeation chromatography (GPC) method. Mw is a weight average molecular weight as calculated as polystyrene, Mn is a number average molecular weight as calculated as polystyrene, and Mw/Mn is a ratio of Mw to Mn.

PREPARATION EXAMPLE 1

Into a stainless steel autoclave equipped with a magnetic stirrer and an electric heater to control the hydrogenation temperature and having an internal capacity of 5 l, a mixture comprising 300 g of polystyrene (DIAREX® HH-102, manufactured by Mitsubishi Monsanto Chemical Company), 2,100 g of cyclohexane (guaranteed reagent), 100 g of a ruthenium hydrogenated catalyst (5% by weight of ruthenium supported on active carbon, water-containing product, manufactured by Nippon Engelhardt K.K.) and 150 g of isopropyl alcohol (guaranteed reagent), was charged. After completion of the charging, the inner atmosphere of the autoclave was replaced by nitrogen gas. While stirring the mixture at a speed of 1,000 rpm, the mixture was heated to a predetermined hydrogenation reaction temperature as identified in Table 1, and hydrogen gas was introduced under a pressure of 45 kg/cm² from an automatic pressure controlling device. The hydrogenation reaction conditions (temperature and time) were set as identified in Table 1, and the temperature was raised and maintained along the set conditions. At the same time, the introduction of hydrogen gas was continued to maintain the pressure in the autoclave at a level of 45 kg/cm².

After completion of the hydrogenation reaction, the internal temperature of the autoclave was cooled to room temperature, the remaining hydrogen gas was removed from the autoclave, and then the cyclohexane solution as the reaction product was withdrawn. To this cyclohexane solution, about 2,000 g of cyclohexane was added, and the mixture was subjected to centrifugal separation and filtration to remove the ruthenium catalyst and insoluble foreign matters. The colorless transparent cyclohexane solution was poured into 10 l of methyl alcohol (first class reagent) to precipitate a vinyl cyclohexane polymer. The vinyl cyclohexane polymer was separated by decantation, washed with methyl alcohol and then dried by a dryer under reduced pressure to obtain a vinyl cyclohexane polymer.

The yield and the physical properties of the vinyl cyclohexane polymer thus obtained were measured. The results are shown in Table 2.

PREPARATION EXAMPLE 2

By using the same autoclave as used in preparation Example 1, the starting materials, the solvent and the catalyst were charged in the same manner as in Preparation Example 1. The hydrogenation reaction was continued in the same manner as in Preparation Example 1 except that the hydrogenation conditions were changed as identified in Table 1. After completion of the reaction, 5 g of polystyrene was added to the cyclohexane reaction solution and dissolved therein. Then, the steps of the removal of the catalyst, the precipitation, the washing and the drying were conducted in the same manner as in Preparation Example 1 to obtain a polymer composed mainly of a vinyl cyclohexane polymer.

The yield and the physical properties were measured. The results are shown in Table 2.

PREPARATION EXAMPLE 3

By using the same autoclave as used in Preparation Example 1, 300 g of p-tert-butylstyrene polymer (Mw=20.4×10⁴, Mn=11.2×10⁴, Mw/Mn=1.82) prepared by suspension polymerization in water, was charged instead of 300 g of polystyrene in Preparation Example 1. The hydrogenation reaction and post-treatment were conducted in the same manner as in Preparation Example 1 except that the hydrogenation conditions were changed as identified in Table 1, whereby polyvinyl p-tert-butylcyclohexane was obtained.

The yield and the physical properties were measured. The results are shown in Table 2.

COMPARATIVE PREPARATION EXAMPLE 1

By using the same autoclave as used in Preparation Example 1, the starting materials, the solvent and the catalyst were charged in the same manner as in Preparation Example 1. The hydrogenation reaction and the post-treatment were conducted in the same manner as in Preparation Example 1 except that the hydrogenation conditions were changed as identified in Table 1, whereby a hydrogenated polystyrene was obtained.

The yield and the physical properties were measured. The results are shown in Table 2.

EXAMPLES 1 to 3

The three types of the vinyl cyclohexane polymers (A) prepared in Preparation Examples 1 to 3 were respectively pelletized by an extruder to obtain molded pellets of Examples 1 to 3, respectively. By using the respective pellets as starting materials, compact disk substrates were prepared by using an injection molding machine for molding disks (Dynamelter M-100A DM, manufactured by Meiki Seisakusho K.K.). With respect to the compact disk substrates thus obtained, the double refraction was measured. The results are shown in Table 3.

Further, test pieces for physical properties were prepared by injection molding by using the three types of pellets as starting materials. By using these test pieces, the physical properties were measured. The results are shown in Table 3.

COMPARATIVE EXAMPLES 1 to 3

In the same manner as in Example 1, compact disk substrates and test pieces for physical properties were prepared by injection molding from three types of resins i.e. the hydrogenated polystyrene (Comparative Example 1) prepared by Comparative Preparation Example 1, a polycarbonate resin (Novalex 7020A, manufactured by Mitsubishi Kasei Corporation) (Comparative Example 2) and a methyl methacrylate resin (Parapet F-1000, manufactured by Kyowa Gas Kagaku Kogyo K.K.) (Comparative Example 3).

Various physical properties were measured with respect to the compact disk substrates and the test pieces for physical properties thus obtained. The results are shown in Table 3.

TABLE 1

| | Hydrogenation conductions (Temperature and time) |
|---|---|
| Preparation Example 1 | 140° C., 10 hrs - 150° C., 20 hrs - 170° C., 10 hrs |
| Preparation Example 2 | 150° C., 20 hrs - 160° C., 15 hrs |
| Preparation Example 3 | 150° C., 20 hrs - 160° C., 20 hrs |
| Comparative Preparation Example 1 | 140° C., 10 hrs |

TABLE 2

| | Yield (g) | Hydrogenation rate (wt %) | Mw × 10⁻⁴ | Mn × 10⁻⁴ | Mw/Mn |
|---|---|---|---|---|---|
| Preparation Example 1 | 298 | 97 | 9.2 | 5.0 | 1.84 |
| Preparation Example 2 | 297 | 85 | 15.0 | 8.0 | 1.87 |
| Preparation Example 3 | 290 | 83 | 7.3 | 4.6 | 1.59 |
| Comparative Preparation Example 1 | 287 | 20 | 25.4 | 13.0 | 1.95 |

(In Preparation Example 2, the yield includes 5 g of non-hydrogenated polystyrene.)

TABLE 3

| | Polymer | Light transmittance (%) | Double refraction (nm) | Refractive index (ηD) | Water absorbance (wt %) | Deflection temperature under load (°C.) (no anealing) | Rockwell hardness (HRM) | Density (g/cm³) |
|---|---|---|---|---|---|---|---|---|
| Example 1 | Preparation Example 1 | 90 | 0 | 1.514 | 0.02 | 142 | 95 | 0.94 |
| Example 2 | Preparation Example 2 | 89 | 6 | 1.520 | 0.03 | 134 | 90 | 0.96 |
| Example 3 | Preparation Example 3 | 89 | 0 | 1.510 | 0.02 | 140 | 90 | 0.90 |
| Comparative Example 1 | Comparative Preparation Example 1 | 89 | 240 | 1.590 | 0.03 | 92 | 85 | 1.04 |
| Comparative Example 2 | Polycarbonate resin | 90 | 12 | 1.586 | 0.15 | 125 | 75 | 1.20 |
| Comparative Example 3 | Methyl methacrylate resin | 92 | 4 | 1.491 | 0.30 | 86 | 95 | 1.19 |

Table 3 shows the following facts.

(1) The optical disk substrate composed essentially of the vinyl cyclohexane polymer (A) of the present invention has a high light transmittance.

(2) The optical disk substrate composed essentially of the vinyl cyclohexane polymer (A) has a small water absorbance as compared with the optical disk substrate made of a polycarbonate resin or a methyl methacrylate resin. Accordingly, it is less likely to have a memory functional layer deteriorated, or to cause warpage of an optical disk.

(3) The optical disk substrate composed essentially of the vinyl cyclohexane polymer (A) has a small double refraction as compared with the optical disk substrate made of a hydrogenated polystyrene having a low hydrogenation rate or a polycarbonate resin. Therefore, it is suitable for an optical disk.

(4) The optical disk substrate composed essentially of the vinyl cyclohexane polymer (A) has features such that the light transmittance is high, the double refraction is small, the refractive index is small, the water absorbance is small, the deflection temperature under load is high, th Rockwell hardness is high, and the density is small, and such various properties are well balanced. Thus, it is suitable for an optical disk.

What is claimed is:

1. An optical disk substrate made of a non-crystalline thermoplastic resin comprising from 80 to 100% by weight of a vinyl cyclohexane polymer (A) containing at least 80% by weight of a vinyl cyclohexane component in the molecular chain and from 0 to 20% by weight of a vinyl aromatic polymer (B) and having a light transmittance of at least 85%, a water absorbance of at most 0.1% by weight and a double refraction of at most 50 nm.

2. The optical disk substrate according to claim 1, wherein the vinyl cyclohexane polymer (A) is a polymer obtained by hydrogenating the aromatic ring of the vinyl aromatic polymer (B).

3. The optical disk substrate according to claim 1, wherein the vinyl aromatic polymer (B) is a noncrystalline polymer of a vinyl aromatic compound, or a copolymer of a vinyl aromatic compound with at most 20% by weight of other vinyl compound.

4. The optical disk substrate according to claim 3, wherein said vinyl aromatic compound is at least one member selected from the group consisting of styrene, α-methylstyrene, p-methylstyrene, t-butylstyrene and vinyl naphthalene.

5. The optical disk substrate according to claim 3, wherein said other vinyl compound is at least one member selected from the group consisting of a diene, a methacrylate, an acrylate, methacrylic acid, acrylic acid, itaconic acid and acrylonitrile.

* * * * *